United States Patent [19]

Kando et al.

[11] 4,293,210

[45] Oct. 6, 1981

[54] RELEASE BUTTON DEVICE FOR CAMERA

[75] Inventors: Toru Kando, Tokyo; Tahei Morisawa, Matsudo, both of Japan

[73] Assignee: Asahi Kogaku Kogyo Kabushiki Kaisha, Tokyo, Japan

[21] Appl. No.: 190,768

[22] Filed: Sep. 25, 1980

[30] Foreign Application Priority Data

Oct. 23, 1979 [JP] Japan .............................. 54/136537

[51] Int. Cl.³ ............................................. G03B 17/38
[52] U.S. Cl. .................................... 354/269; 354/266
[58] Field of Search ............... 354/266, 267, 268, 269; 352/178, 179

[56] References Cited

U.S. PATENT DOCUMENTS 4,167,317   9/1979   Kawamura .......................... 354/269

*Primary Examiner*—Michael L. Gellner

*Attorney, Agent, or Firm*—Sughrue, Mion, Zinn, Macpeak & Seas

[57] ABSTRACT

A release button device for controlling the release of a shutter in an electromagnetic release type camera in which commercially available cable release units and electrical remote release units can be both used. An electrically conductive release button which is adapted for receiving the cable release unit is coupled to an electrically insulative central core frame. The plunger of the cable release unit can pass through an aperture formed in the release button and central core frame. An electrically conductive central core frame is slidably disposed in the aperture in the core frame. A protrusion which forms a first contact of a release switch is positioned below a lower end of the central core and a dome-shaped contact piece forming the second contact is disposed therebetween. Upon depression of the release button or a plunger of a cable release unit, the contact piece is pushed into contact with the protrusion thus closing the release switch.

3 Claims, 4 Drawing Figures

RELEASE BUTTON DEVICE FOR CAMERA

BACKGROUND OF THE INVENTION

The present invention relates to a release button device for controlling the release of the shutter of an electromagnetic release type camera.

Recently, as cameras having increasingly incorporated electronic circuitry, a so-called "electromagnetic release system" has been extensively employed in which members locking the shutter operation are operated by an electromagnet. In this electromagnetic release system, the release button is used merely to operate a switch thereby providing a very simple arrangement. However, such a system cannot use commercially available cable release units. In order to overcome this difficulty, it is necessary to additionally provide a remote release terminal. Thus, the conventional electromagnetic release system is inconvenient in practical use. This inconvenience cannot be overcome without increasing the number of components and making the arrangement of the release system intricate.

Accordingly, an object of the invention is to provide a release button device for an electromagnetic release type camera which enables the release operation to be carried out with a commercially available cable release unit and also enables the use of an electrical remote release unit. That is, it is an object of the invention to provide a release button device which is usable commonly for both a commercially available cable release unit and an electrical remote release unit.

SUMMARY OF THE INVENTION

This, as well as other objects of the invention, are met by a release button device for an electromagnetic release type camera in which the operation of the shutter member is energized and operated electrically. An electrically conductive release button is adapted to receive a cable release unit at least one of the plunger and threaded portion of which may be made of an electrically insulating material. An electrically insulative central core frame is coupled to the release button such as by threaded engagement therewith. The central core frame has an aperture formed therein aligned with an aperture in the release button. The aperture in the core frame is sufficiently large to pass the plunger of the cable release unit connected to the release button. In a preferred embodiment, the central core frame has protruding portions which engage with the release button outer frame to prevent the upward movement of the release button beyond its normal or rest position. An electrically conductive central core is slidably disposed in the aperture in the core frame. A protrusion is positioned below a lower end of the central core and serves as a first contact of a release switch for switchably connecting a power source to operate the shutter member. The protrusion is electrically connected to the release button, preferably through the release outer frame. The protrusion may be formed on an electrically conductive supporting frame which may be formed integrally with the release button outer frame. A contact piece, which is preferably dome-shaped and springable, is disposed between the central core and the protrusion and is electrically insulated from the protrusion in the normal position of the release button. The contact piece is movably into contact with the protrusion upon depression of the release button or plunger. The contact piece forms a second contact of the release switch. Preferably, the release button is mounted in the release button outer frame in such a manner as to prevent the rotation of the release button.

DESCRIPTION OF THE PREFERRED EMBODIMENTS

Figure 1:
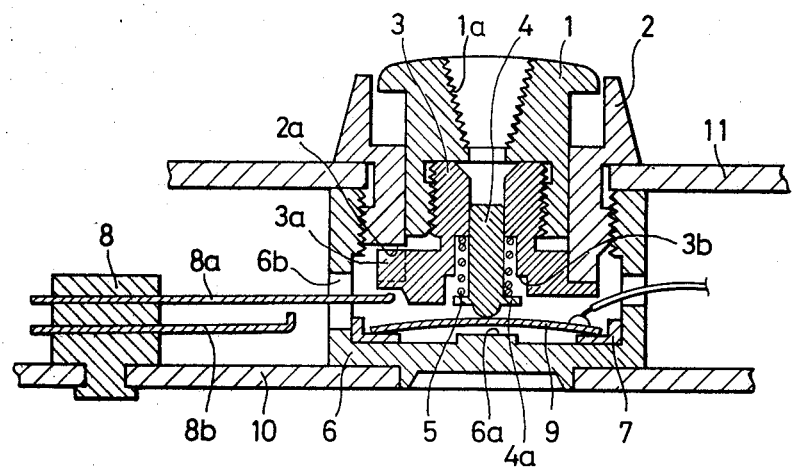
FIG. 1 is a sectional view showing a preferred embodiment of a release button device according to the invention.

A preferred embodiment of a release button device for a camera constructed according to the invention will be described with reference to the accompanying drawings.

An electrically conductive release button 1, which is operable by the photographer, has a threaded portion 1a to which a commercially available cable release unit can be connected. The release button 1, disposed in a release button outer frame 2, is threadably engaged with a central core frame 3 so that the release button 1 cannot be removed from the release button outer frame 2. The central core frame 3 has protruding portions 3a which are inserted into cuts 2a formed in the release button outer frame 2. Accordingly, with respect to the release button outer frame 2, the release button 1 is vertically slidable, but not rotatable.

An electrically conductive supporting frame 6 is fixedly mounted on a base plate 10, which is also electrically conductive, so that the supporting frame 6 is electrically connected (or grounded) to the camera body. A spring contact piece 9 has the form of a dish or dome. The contact piece 9 is placed through an insulator 7 in the supporting frame 6. A lead wire is soldered directly to the contact piece 9 so that the contact piece 9 forms one of the contacts of a release switch 17. A central core 4 and a return spring 5 are inserted into the central core frame 3 and the release button outer frame 2 is threadedly engaged with the supporting frame. That is, the release button 1, the release button outer frame 2, and the central core frame 3, which form a single unit, are assembled with the supporting frame 6. As a result, the release button 1 is electrically connected to the camera body.

The central core 4 is electrically conductive and is vertically slidable. The central core 4 is maintained in contact with the contact piece 9 by the return spring 5. The material of the contact piece 9 is so selected that its elastic force is much larger than the elastic force of the return spring 5. Therefore, normally a gap is maintained between the contact piece 9 and the protrusion 6a of the supporting frame 6 and the release button 1 and the central force of the return spring 5.

A photometric switch 18 has contact pieces 8a and 8b which are fixedly secured through an insulator 8 to the base plate 10. The contact piece 8a extends into the supporting frame 6 through a sufficiently large through-hole formed in the supporting frame 6 a sufficient distance to contact the lower end of the central core frame 3.

The release button device is constructed as described above. As such, upon depression of the release button 1 by the photographer, first the step 3b of the central core frame 3 comes into abutment against the step of the central core 4. With this stroke, the contact piece 8a is depressed and contacts the piece 8b. That is, the photometric switch 18 is closed to operate a photometric circuit 20. When the release button 1 is further depressed, the elastic contact piece 9 in the form of a dish is bent by the central core 4 to contact the protrusion 6a of the supporting frame 6. As a result, the release switch 17 is closed as a result of which current flows from a power source 21 to an electromagnet 19 thereby to start the operation of the shutter.

Figure 2:
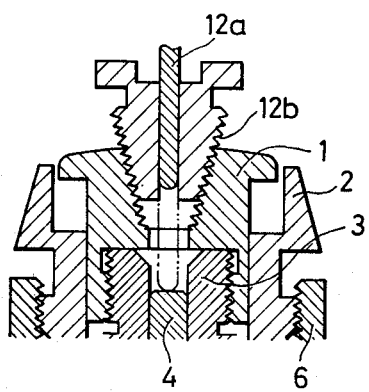
FIG. 2 is a sectional view of the release button device to which a commercially available cable release unit is connected.

When a commercially available cable release unit is connected to the threaded portion 1a of the release button 1, the cable release unit is electrically connected through the release button 1, the release button outer frame 2 and the supporting frame 6 to the camera body. When the cable release unit is operated, the plunger 12a of the cable release unit extends until it contacts the upper end of the central core 4 as indicated by the two-dot chain line in FIG. 2 at which point the release switch 17 is closed through the central core 4. At least one of the plunger 12a and the threaded part 12b of the cable release unit may be made of an electrically insulating material. The plunger 12a is operated to push the central core 4 thereby to bend the contact piece 9 so that the contact piece 9 is brought into contact with the protrusion 6a and accordingly the release switch 17 is closed.

Figure 3:
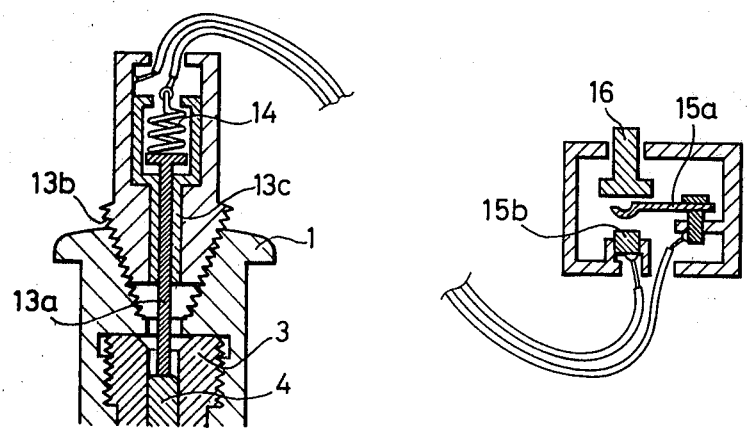
FIG. 3 is also a sectional view of the release button device to which an electrical remote control release unit is connected.
Figure 4:
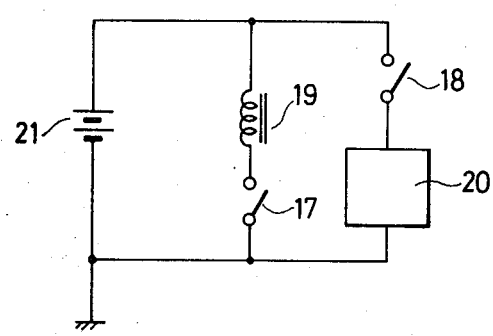
FIG. 4 is a schematic circuit diagram showing an electromagnetic release circuit in a camera.

An electrical remote control release unit may be connected to the release button device as shown in FIG. 3. In this case, in the connecting part of the release unit which is connected to the release button 1, the electrically conductive plunger 13a is maintained connected to the central core 4 by means of a spring 14 at all times but the electrically conductive plunger 13a is electrically insulated from the threaded part 13b by an insulator 13c and therefore the release switch 17 is not closed. However, with the plunger 13a and the threaded part 13b electrically connected through lead wires to contact pieces 15a and 15b, respectively, which are provided at the other end of the release unit so that the contact pieces 15a and 15b are brought into contact with each other by operating a push button 16, the release switch can be opened and closed by operating the pushbutton 16.

The release button device for cameras according to the invention can be used both with a cable release button unit and an electrical remote release unit which are commercially available as described above and the arrangement of the operating means in the camera is common for both of the units. Thus, the employment of the release button device according to the invention facilitates the use of the camera without increasing the number of components of the camera.

What is claimed is:

1. A release button device for an electromagnetic release type camera in which the operation of a shutter member is energized electrically comprising:
    an electrically conductive release button adapted for receiving a cable release unit, said release button being mounted on said camera with the rotation of said release button being limited;
    an electrically insulative central core frame coupled to said release button, said central core frame having an aperture formed therein aligned with an aperture in said release button, the diameter of said aperture in said core frame being sufficiently large to pass the plunger of a cable release unit connected to said release button;
    an electrically conductive central core slidably disposed in said aperture in said core frame;
    a protrusion positioned below a lower end of said central core, said protrusion serving as a first contact of a release switch for switchably connecting a power source to operate said shutter member, said protrusion being electrically connected to said release button; and
    a contact piece disposed between said central core and said protrusion, electrically insulated from said protrusion in a normal position of said release button, and movable into contact with said protrusion upon depression of said release button or plunger, said contact piece forming a second contact of said release switch.

2. A release button device for an electromagnetic release type camera in which the operation of a shutter member is energized electrically comprising:
    a release button outer frame mounted upon the body of said camera;
    an electrically conductive release button slidably disposed within said release button outer frame, said release button having a threaded portion adapted for receiving a cable release unit;
    an electrically insulative central core frame coupled to said release button, said central core frame having an aperture formed therein aligned with an aperture in said sleeve button wherein a plunger of the cable release unit connected to said release button can pass through said aperture in said central core frame, said central core frame having a protruding portion engaging with a flange of said release button outer frame for restricting the upward movement of said release button;
    an electrically conductive central core slidably disposed in said aperture in said core frame;
    a return spring for biasing said central core downwardly;
    an electrically conductive supporting frame disposed below said release button and central core frame, said supporting frame having a protrusion formed thereon below a lower end of said central core, said protrusion forming a first contact of a release switch for switchably connecting a power source for operating said shutter member, said supporting frame being electrically connected to said release button through said outer frame; and
    a dome-shaped contact piece disposed between said central core and said protrusion, said contact piece being supported on said supporting frame by an insulating member, said contact piece being springably movable into contact with said protrusion upon depression of said release button or plunger, and said contact piece forming a second contact of said release switch.

3. The release button device as claimed in claim 1 or 2 further comprising a contact piece of a photometric switch connected in series with a photometric circuit, said contact piece extending into a range of movement of said central core frame wherein said photometric switch is closed with a first amount of depression of said release button and said release switch is closed with a second amount of depression of said release button.

* * * * *